United States Patent
Knappe

(10) Patent No.: US 6,238,757 B1
(45) Date of Patent: *May 29, 2001

(54) THERMOPLASTIC- AND UP- OR EP-BASED LAMINATE PLASTICS

(76) Inventor: Holger Knappe, Ringstrasse, D-23845 Grabau (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/027,849

(22) Filed: Sep. 9, 1992

(51) Int. Cl.$^7$ .................................................. F16L 17/02
(52) U.S. Cl. ...................... 428/35.7; 428/36.3; 428/36.4; 428/36.9; 428/36.91
(58) Field of Search ........................... 525/437; 428/35.7, 428/36.3, 36.4, 26.9, 36.91

(56) References Cited

U.S. PATENT DOCUMENTS

| | | |
|---|---|---|
| 4,189,452 | 2/1980 | Haddad et al. . |
| 4,961,977 | * 10/1990 | Archer et al. ........................ 428/36.3 |
| 5,091,230 | * 2/1992 | Fuchs et al. ......................... 428/36.3 |
| 5,271,855 | * 12/1993 | Hoefer et al. ........................ 525/437 |

FOREIGN PATENT DOCUMENTS

| | | |
|---|---|---|
| 1297269 | 6/1969 | (DE) . |
| 1297262 | 3/1974 | (DE) . |
| 2456493 | 8/1975 | (DE) . |
| 3342386 | 5/1985 | (DE) . |
| 0204306 | 12/1986 | (EP) . |
| 0345450 | 12/1989 | (EP) . |
| 2099753 | 12/1982 | (GB) . |
| 2116476 | 9/1983 | (GB) . |

OTHER PUBLICATIONS

Plastverarbeiter, 34 Jahrgang, 1983, Nr. 1, pp. 31–36.
W. Nicolaus et al, "Neue Verarbeitungstechniken durch lichthartende Einkomponentensysteme*", PLASTverarbeiter 34, Jahrgang 1983 Nr. 1.

* cited by examiner

Primary Examiner—S. Mark Clardy
Assistant Examiner—Kathryne E. Shelborne
(74) Attorney, Agent, or Firm—Pillsbury Madison & Sutro LLP

(57) ABSTRACT

The invention relates to laminate plastics, preferably in the form of tubes, having an inner layer of thermoplastic and an outer layer of typically fiber-reinforced reaction resins, and is characterized in that the curing of the reaction resins is effected by light curing at temperatures between approximately 20 and 60° C.

5 Claims, No Drawings

THERMOPLASTIC- AND UP- OR EP-BASED LAMINATE PLASTICS

FIELD OF THE INVENTION

The invention relates to laminate or composite plastics, which are finding increasing use in many fields in industry. By combining two or more plastics, it is often possible to positively affect or eliminate disadvantageous characteristics of one plastic by combining it with another plastic. Composite plastics also include combinations in which, for example, an inner layer of a certain plastic is combined with an often fiber-reinforced outer layer of unsaturated polyester or epoxy resins.

BACKGROUND OF THE INVENTION

A disadvantage of unsaturated polyester resins, hereinafter called UP, which have many industrially desirable properties, is the considerable shrinkage of these plastics upon curing, however; it may amount to up to 60 to 10% and may still be considerable even when fiber fillings, in particular glass fibers, are added. If shrinkage of the UP resins in cross-linking is to be avoided, it is necessary as a rule to use fillers, yet they are often undesirable for other reasons or can cause difficulties in industrial processing. Epoxy resins, hereinafter called EP, have the same disadvantages.

Laminate plastics for tubes, for instance, have therefore so far required a relatively complicated production process, since as a rule the inner layer is embodied as a so-called liner, which must be mounted on a mandrel and then provided with the jacket layer wound on its outside. In cross-linking of the jacket layer, which was previously typically done thermally, shrinkage occurs, however, which can in turn lead to hairline cracks in the liner. The production of such tubes therefore requires not only a great deal of experience, but is also time-consuming and expensive, and this makes itself felt in the relatively high prices for the finished products. Instead of the usual thermal cross-linking of the outer layer, cold curing of such synthetic resins is already known, but that has the disadvantage in turn that the UP resin, provided with hardeners and accelerators, allows only very brief processing times of the starting mixture. EP resins can also be processed by cold curing; however, the curing time is longer than with UP resins.

There is accordingly a need for practically shrinkage-free laminate plastics of thermal plastics for the inner and reaction resins for the outer layer that can be produced in a relatively economical process.

SUMMARY OF THE INVENTION

Surprisingly, it has now been found that composite plastics, preferably in the form of tubes, can be produced in it simple manner with an inner layer of thermal plastics and an outer layer of typically fiber-reinforced reaction resin, if the curing of the reaction resin is performed as light curing at approximately 20 to 60°.

DESCRIPTION OF THE INVENTION

UP resins are obtained from multibasic unsaturated carboxylic acids, such as maleic acid, fumaric acid, itaconic acid or their anhydrides, phthalic acid and other unsaturated acids, by conversion with saturated divalent alcohols, such as ethylene glycol, propane and butane diols, cyclohexane dimethanol or neopentylglycol. In the conversion, resins are obtained that have a molecular weight of approximately 2000 to 5000, which immediately dissolve in monomers suitable for the cross linking. These solvents, which can have a bridging effect by addition at two double bonds, mainly are styrene, methyl styrene or various allyl or acrylic esters. The cross linking ensues upon heating and/or under the influence of peroxide catalysts, with the cooperation of accelerators, such as amine salts and heavy metal salts. Optionally, the curing may also be performed by the action of ionizing radiation or UV radiation in the presence of sensitizers, such as quinones.

According to the invention, UP resins available on the market are used, having a high proportion of neopentylglycol in the alcoholic component, of the kind sold for instance by various firms, including Hoechst AG, Bayer AG, BASF AG, CW Hüls AG, or Vieanova Kunstharz AG. Preferably, however, a mixture of approximately at least 30% neopentylglycol, 30% vinyl ester and the remainder being isophthalic acid is used, with styrene or optionally acrylic ester being usable as a solvent and stabilizer. The glass fiber component in these mixtures should amount to approximately 70 to 80% as a rule, all these figures being referred to the weight. Approximately 1.5% BPO, 2% of a quinone, and a very small quantity, in the range from approximately 0.0 to 0.1%, of a mixture of a cobalt soap and diethylaniline are added as the peroxide catalyst. Preferably, the mixture also includes a proportion on the order of approximately 10% of a thermoplastic, especially the particular thermoplastic that is simultaneously used as an inner layer or liner. It has in fact been found that by the addition of a slight quantity of a thermoplastic, the shrinkage resistance in tubes can be increased so much that virtually no further shrinkage occurs.

Epoxy resins are created by the poly addition of compounds that contain one or more reactable terminal epoxy groups, with acids, acid anhydrides or amines. In these reactions, the resins cross-link and cure. The prototype of the EP resins is the conversion product of bisphenol A and epichlorohydrin, but other phenols may also be used instead of the aromatic bisphenyl A, and the epichlorohydrin can be replaced by cycloaliphatic oxides. In the reaction of the epoxidy resin with alcohols, acid, acid anhydrides or amines, which are present not as catalysts but rather as reaction partners, it is critical to adhere precisely to the quantity ratios, if plastics with particular properties are to be produced. Acid anhydrides or aromatic amines are predominantly used as curing agents which accordingly enter into the reactions; the curing time is several hours at temperatures above 100° C. For EP resins as well, cold hardeners are known, namely polyamines, polyaminoamides and special acid anhydrides. As diluents and to adjust the viscosity, so-called reactive diluents are used, which themselves contain epoxy groups and are involved in the curing mechanism.

Unmodified EP resins are typically relatively hard and brittle and tend to form hairline cracks. EP resins are therefore often processed with plasticizers, or a slight quantity of a thermoplastic may be dissolved in the reactive hardener, to improve the flexibility. EP resins may also be subjected to light curing.

As an inner layer or liner, PVC and, depending on the application, super pure PVC or CPVC are preferably used. Rechlorinated polyvinylchloride, which may have chloride contents of up to 64% by weight and is distinguished over PVC homopolymers by a higher temperature resistance and better chemical stability, is called CPVC. Plasticizer-free rechlorinated polyvinylchloride is unobjectionable in foods and is allowed to be used to produce hoses, bar equipment and the like.

Depending on the later use intended, the inner layer or liner may also be of other thermoplastics; for instance, the use of PPO is preferred in those cases in which increased resistance to chemicals is needed. PPO can also be used in foods and is distinguished by its chemical and mechanical resistance even at elevated temperatures. For certain purposes, the physiologically unobjectionable PVDF may also be used.

The EP resins may also be subjected to cold curing, and again light is used, at a wavelength of from 300 to 350 nm. Photoinitiators in cold curing of EP resins include special substituted phosphine oxides, for instance, often used together with polyamines, which are likewise reaction partners in the polyaddition, or cyclopentadiene-benzene-iron sandwich complexes. In accordance with current knowledge, it must be presumed in these cases as well that a complete solid connection takes place between the liner and the reaction resin, because a partial dissolution of the liner also occurs in the cold curing, apparently from the reactive hardeners.

Because of the production process, the wall thicknesses of the jacket layer can be reduced considerably in comparison with previous products, while having the same load capacity, which begins at operating pressures of up to 70 bar. Because of the resultant saving in material and the very much less time-consuming production process, the products can be produced extremely economically.

The considerable pressure resistance of the plastics according to the invention, despite the relatively thin jacket layers, is especially surprising. While epoxy-based tubes of typical design, without liners, must have a wall thickness of up to 5 bar at operating pressures of 10 bar, for instance, the jacket thickness of corresponding tubes according to the invention is barely 1 cm at operating pressures of up to 25 bar, with a safety factor of S6. The safety factor indicates the multiple of the operating pressure up to the bursting pressure, or in other words, the tubes briefly withstand loads of up to 300 bar. A special advantage is that the tubes, because of the liner, are media-tight even at this kind of operating pressures, in contrast to the tubes used previously, which upon continuous load tend to seep, because of hairline cracks. In a preferred embodiment, the invention therefore includes laminate plastics that are media-tight at operating pressures of 25 bar or above and a safety factor of 4 or 6 (as defined by ASTM X).

It has also been found that by cold curing under the conditions given, a practically completely polymerization of the styrene or acrylic ester used as the solvent and stabilizer can be attained, so that the styrene residue contents in the final product are below 0.07% and preferably below 0.005%.

The composite plastics according to the invention are preferably produced in the form of tubes and are used in this form in reverse osmosis or ultra filtration. However, they may also be used in the food industry, for instance in processing beer, dairy products, fruit juices, or the like. Another field of application is the production of super pure water, as needed for instance in the production of electronic components. The primary field of application, however, is seawater desalination, because in this form of practically employed reverse osmosis, the physiological unobjectionability of the liner is important, and a further consideration is that the pure PVC liners typically used have a very smooth surface, for the sake of a low-growth inner layer that prevents or greatly reduces the otherwise typical deposition of algae and other microorganisms from the seawater.

The invention is described in further detail below in terms of an example:

PVC tubes for reverse osmosis with a diameter of approximately 11 cm, are sheathed in a manner known per se with glass fibers, saturated in UP resin, in a winding process. A product is used as the UP resin that contains a reaction resin comprising approximately 30% neopentylglycol, 30% vinyl ester, 30% isophthalic acid and 10% PVC in styrene as a solvent. Approximately 1.5% BPO, 1% photoinitiator, 3% of a quinone and 0.05% of a mixture of cobalt soap and diethylaniline are added as an accelerator/sensitizer system. Curing is done by exposure to UV light at a wavelength of 300 nm for a period of approximately 10 minutes.

What is claimed is:

1. An improved method for the manufacture of composite tubes comprising the steps of:

obtaining an inner liner tube, the inner liner tube comprising a liner material selected from the group consisting of PVC, ultra pure PVC, CPVC, PPO, and PVDF;

wrapping the inner liner tube with a reinforcing material to form a reinforcing layer of predetermined thickness, the reinforcing material being impregnated with a photo-polymerizable resin, the photo-polymerizable resin comprising between about 20% and about 30% of the reinforcing layer, to form a reinforced tube;

curing the reinforcing layer by exposure to UV radiation for a predetermined curing time at a temperature between about 20° C. and about 60° C. to form a composite tube.

2. An improved method for the manufacture of composite tubes according to claim 1 wherein after a predetermined curing time of 10 minutes the curing step is essentially complete wherein the reinforcing layer has a styrene residue level of less than 0.07%.

3. An improved method for the manufacture of composite tubes according to claim 1 wherein the photo-polymerizable resin comprises about 30% neopentylglycol, about 30% vinyl ester, about 30% isophthalic acid, about 10% of the liner material in a solvent, about 1.5% BPO, about 1% photoinitiator, 3% quinone, and up to about 0.1% of a sensitizer mixture.

4. An improved method for the manufacture of composite tubes according to claim 3 wherein the solvent is selected from a group consisting of styrene and acrylic ester.

5. An improved method for the manufacture of composite tubes according to claim 4 wherein the sensitizer mixture comprises a mixture of cobalt soap and diethyaniline.

* * * * *